(12) United States Patent
Chait

(10) Patent No.: US 6,942,234 B1
(45) Date of Patent: Sep. 13, 2005

(54) HAND-POWERED VEHICLE

(76) Inventor: Paul Nicholas Chait, 366 Holly Dr., San Rafael, CA (US) 94903

( * ) Notice: Subject to any disclaimer, the term of this patent is extended or adjusted under 35 U.S.C. 154(b) by 0 days.

(21) Appl. No.: 10/769,113

(22) Filed: Jan. 30, 2004

(51) Int. Cl.[7] ............................................. B62M 1/16
(52) U.S. Cl. ...................................................... 280/244
(58) Field of Search ................................ 280/244, 245, 280/246, 247, 248, 253, 255

(56) References Cited

U.S. PATENT DOCUMENTS

| | | | | |
|---|---|---|---|---|
| 3,175,844 A | * | 3/1965 | Whitehouse | ................. 280/221 |
| 4,124,222 A | * | 11/1978 | Moe et al. | ................... 280/221 |
| 4,453,729 A | * | 6/1984 | Lucken | .................... 280/250.1 |
| 5,272,928 A | * | 12/1993 | Young | ......................... 74/137 |
| 5,690,346 A | * | 11/1997 | Keskitalo | ..................... 280/234 |
| 5,829,772 A | * | 11/1998 | Jones | .......................... 280/234 |
| 6,708,997 B2 | * | 3/2004 | Chait | ........................... 280/245 |
| 2002/0153691 A1 | * | 10/2002 | Liao et al. | ............... 280/250.1 |

* cited by examiner

Primary Examiner—Kevin Hurley
(74) Attorney, Agent, or Firm—Risto A. Rinne, Jr.

(57) ABSTRACT

A wheeled apparatus is provided that converts alternate back and forth longitudinal motion supplied by the arms of a user to a pair of members into rotary motion that is used to drive the apparatus forward. The members move in opposite direction pulling and releasing a pair of chain segments that each a freewheel. Each freewheel drives an axle when rotated in one direction and coasts in the opposite direction. A drive gear is attached to the axle and supplies power to a driven gear attached to a multi-speed internal gear hub. A brake is also attached to the hub. An optional supplemental source of motive power such as an electric motor or gasoline engine can also be included.

21 Claims, 2 Drawing Sheets

HAND-POWERED VEHICLE

This application is related to prior co-pending application Ser. No. 09/948,512, entitled "Hand-Powered Vehicle" by the same inventor, filed on Sep. 7, 2001, now approved for allowance.

BACKGROUND OF THE INVENTION

1. Field of the Invention

The present invention, in general relates to wheeled vehicles and, more particularly, to mobile types of devices that are powered by hand.

Hand powered mobile devices are generally known. For example, hand-powered rail carts for use on railroad tracks that have a central pivotal bar that is alternately raised and lowered are well known devices that can be powered by one or more persons simultaneously, but they are not practical for use on the street, especially by an individual operator. There are a number of reasons why these, and other prior art types of devices, are not well suited for individual use or for use on the street.

One such reason is because they tend to have large, cumbersome mechanisms and, as such, do not lend themselves well for use with smaller and lighter types of vehicles, for example, with two or three-wheeled types of scooters.

Recent developments in lightweight and durable materials have contributed to a great variety of small, folding types of scooters. These include two-wheeled types of mobile devices that are propelled by an individual standing on a platform of the scooter and kicking with one leg to propel the device.

This type of a kicking impulse makes for limited and inefficient use of the strengths of the individual and furthermore, because the individual is likely to use only a predominant leg for kicking, it fosters an uneven pattern of physical development (i.e., exercise).

It is desirable to be able to use the arms and hands of the individual to supply a motive force for a smaller, scooter-like, vehicle yet no lightweight and effective mechanism currently exists for doing so.

It is also desirable to use the muscle groups in the arms to supply this force. The arms have substantial muscle groups that, if an ergonomic system were to well utilize them, are well adapted to propel a scooter-like type of a vehicle.

Furthermore, doing so would strengthen the upper body while simultaneously providing a practical vehicle for short distance commuting.

Furthermore, prior types of hand powered devices do not provide a method for synchronizing the motion of both hands (and arms) of the user so that an alternating pushing and pulling motion, each arm at a time and in opposite relation to the other, would occur. Such a synchronized pattern of movement is optimally desired to provide the motive impulse.

A synchronized motion that ensures a particular relative position of one hand alternating back and forth when compared to the other is optimum for both power generation and also for comfort.

It is preferable to set up a routine whereby a recurrent pattern of motion occurs. This is one reason why pedaling a bicycle is so common. It involves a recurrent pattern of motion and that creates familiarity and the familiarity, in turn, fosters user comfort and confidence in the process and product.

Also, kicking a scooter provides a motive force (i.e., an impulse) and then the scooter coasts for a predetermined period of time until another kick can be accomplished. In other words the motive force is intermittent. It is desirable to be able to supply a more continuous motive force (i.e., one with a greater duty cycle whereby motive power is being supplied most of the time) to a scooter-like vehicle.

There is also a need for being able to change the gear ratios of a hand-powered vehicle. A high gear ratio is helpful when initially beginning to move, going up a hill, it is desirable to go slowly, or when carrying a heavy load. A medium gear ratio is helpful after beginning to move, going up a slight incline or on level ground, when it is desirable to go at a medium speed, or when carrying a moderate load. A high gear ratio is helpful after attaining a brisk speed, going up down slight incline or on level ground, when it is desirable to go at a high speed, or when carrying a light load. Clearly, no one speed can optimally satisfy all of the above conditions.

There is also a need to brake and slow down on demand a hand-powered vehicle. Clearly, this would provide optimum safety.

There is also a need to provide as lightweight as possible a hand-powered vehicle. Meshing types of gears (that mesh together) and racks are solid structures that add considerable weight and bulk whereas chains and gears that are driven off of the chains, as in a conventional bicycle, optimize the transfer of power at minimum weight.

Additionally, there is a need for an alternate source of power that can be integrated for use with a hand-powered vehicle. For example, a small gasoline or electric motor and battery, if it could be used to supplement human powered force would be a desirable addition.

Accordingly, there exists today a need for a hand-powered vehicle that is lightweight, effectively transfers power derived from the hand and arm motion of the user into rotary motion that is used as a motive force, provides this force more evenly and continuously than by kicking, includes a variety of gears, includes a brake, is adapted for a supplemental source of power, and which provides a positive and predictable relationship between two members that are alternately moved back and forth by the user.

Clearly, such an apparatus would be a useful and desirable device.

2. Description of Prior Art

Hand-powered vehicles are, in general, known. For example, the following patents describe various types of these devices:

U.S. Pat. No. 6,352,274 to Redman, March, 2002;
U.S. Pat. No. 6,080,088 to Petersen et al., Jun. 27, 2000;
U.S. Pat. No. 5,653,663 to McCahon, August, 1997;
U.S. Pat. No. 5,050,864 to Pertramer, Sep. 24, 1991;
U.S. Pat. No. 5,007,655 to Hanna, Apr. 16, 1991;
U.S. Pat. No. 4,960,286 to Henson, Oct. 2, 1990;
U.S. Pat. No. 4,861,055 to Jones, Aug. 29, 1989;
U.S. Pat. No. 4,460,190 to Speiss, July, 1984;
U.S. Pat. No. 4,189,166 to Lindsey, Feb. 19, 1980;
U.S. Pat. No. 2,085,657 to Heisdorf, Jun. 29, 1937;
U.S. Pat. No. 1,735,665 to Ashby, Nov. 12, 1929;
U.S. Pat. No. 1,455,124 to Swinland, May 15, 1923;
U.S. Pat. No. 946,280 to Slotkin, January, 1910;
U.S. Pat. No. 926,131 to McGowan, Jun. 29, 1909;
U.S. Pat. No. 843,646 to Vogel, February, 1907;
U.S. Pat. No. 577,572 to Cross, Feb. 23, 1897;
U.S. Pat. No. 435,665 to Minnix, September, 1890; and
Japanese document number 4-243681 to Ishi, August, 1992.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a hand-powered vehicle that is lightweight.

It is also an important object of the invention to provide a hand-powered vehicle that is reliable to use.

Another object of the invention is to provide a hand-powered vehicle that includes a method for varying a mechanical advantage sufficient to change the force that is required in order to effectively impel the vehicle.

Still another object of the invention is to provide a hand-powered vehicle that includes a method for varying a gear ratio sufficient to change the force that is required to impel the vehicle.

Yet another important object of the invention is to provide a hand-powered vehicle that provides a fixed and predictable relationship between two members that are alternately moved back and forth by a user.

Still yet another important object of the invention is to provide a hand-powered vehicle that includes a hand-powered scooter.

Still yet one further important object of the invention is to provide a hand-powered vehicle that eliminates "dead spots" in the motive power supply process.

It is a first continuing object of the invention is to provide a hand-powered vehicle that includes multiple gears that can be selected from during use.

It is a second continuing object of the invention is to provide a hand-powered vehicle that includes a brake.

It is a third continuing object of the invention is to provide a hand-powered vehicle that includes a chain drive mechanism.

It is a fourth continuing object of the invention is to provide a hand-powered vehicle that can accommodate a supplemental source of motive power.

It is a fifth continuing object of the invention is to provide a hand-powered vehicle that is adapted for a supplement electric motor.

It is a sixth continuing object of the invention is to provide a hand-powered vehicle that is adapted for a supplemental gasoline motor.

It is a seventh continuing object of the invention is to provide a hand-powered vehicle that can accommodate a supplemental source of motive power, wherein both human power and the supplement source of motive power are seamlessly integrated, each providing power when desired, or alternately, or simultaneously.

Briefly, hand-powered vehicle that is constructed in accordance with the principles of the present invention has a platform and at least two wheels that are attached to the platform. A user stands on the platform. An apparatus for converting an alternating back and forth motion by two arms of the user into a rotary motion is provided and is adapted to supply a torque to a driven wheel. The arms supply the necessary force to a pair of pivoting members that are each disposed on a shaft and which each include a first and a second idler gear respectively that are operatively attached to the shaft and to each other whereby motion supplied to either of the pivoting members by either of the arms in either direction will cause the remaining pivoting member to move in an opposite direction. A portion of each of the pivoting members extends below each shaft and below the platform where each is attached to a first end of a first and second chain segment, respectively. The apparatus includes a first freewheel gear and a second freewheel gear operatively attached to an axle along with a drive gear. The first chain segment extends from one of the pivoting members rearward and around the first freewheel gear and back toward the front of the apparatus. A first end of a first spring is attached to a remaining end of the first chain segment and a second end of the first spring is attached to the apparatus sufficient to maintain the first chain segment under tension. A first end of a second spring is attached to a remaining end of the second chain segment and a second end of the second spring is attached to the apparatus sufficient to maintain the second chain segment under tension. Accordingly, whenever either of the pivoting members is urged in either direction, the first chain segment is rotating the first freewheel in a first direction and the second chain segment is rotating the second freewheel in an opposite direction. Each freewheel, when rotated in a first drive direction, transfers power to the axle which rotates at the same rate as the freewheel. Each freewheel, when rotated in an opposite direction, coasts freely without affecting the axle. A drive gear is attached to the axle and includes a drive chain loop that supplies motive power to a driven gear on a driven wheel as the pivoting members are urged back and forth. The driven wheel includes an internal hub multi-speed gear ratio that can be selected from among a plurality of gear ratios to control how much the driven wheel rotates for each revolution of the driven gear. A brake mechanism is attached to the hub. Cables attached to the hub extend to the pivoting members to allow gear ratio selection and braking capability by the hands of a user. According to a modification, a third freewheel is attached to the axle and a supplemental source of power, for example either an electric motor or gasoline engine, is used to supply additional motive power.

DETAILED DESCRIPTION OF THE INVENTION

Figure 1:
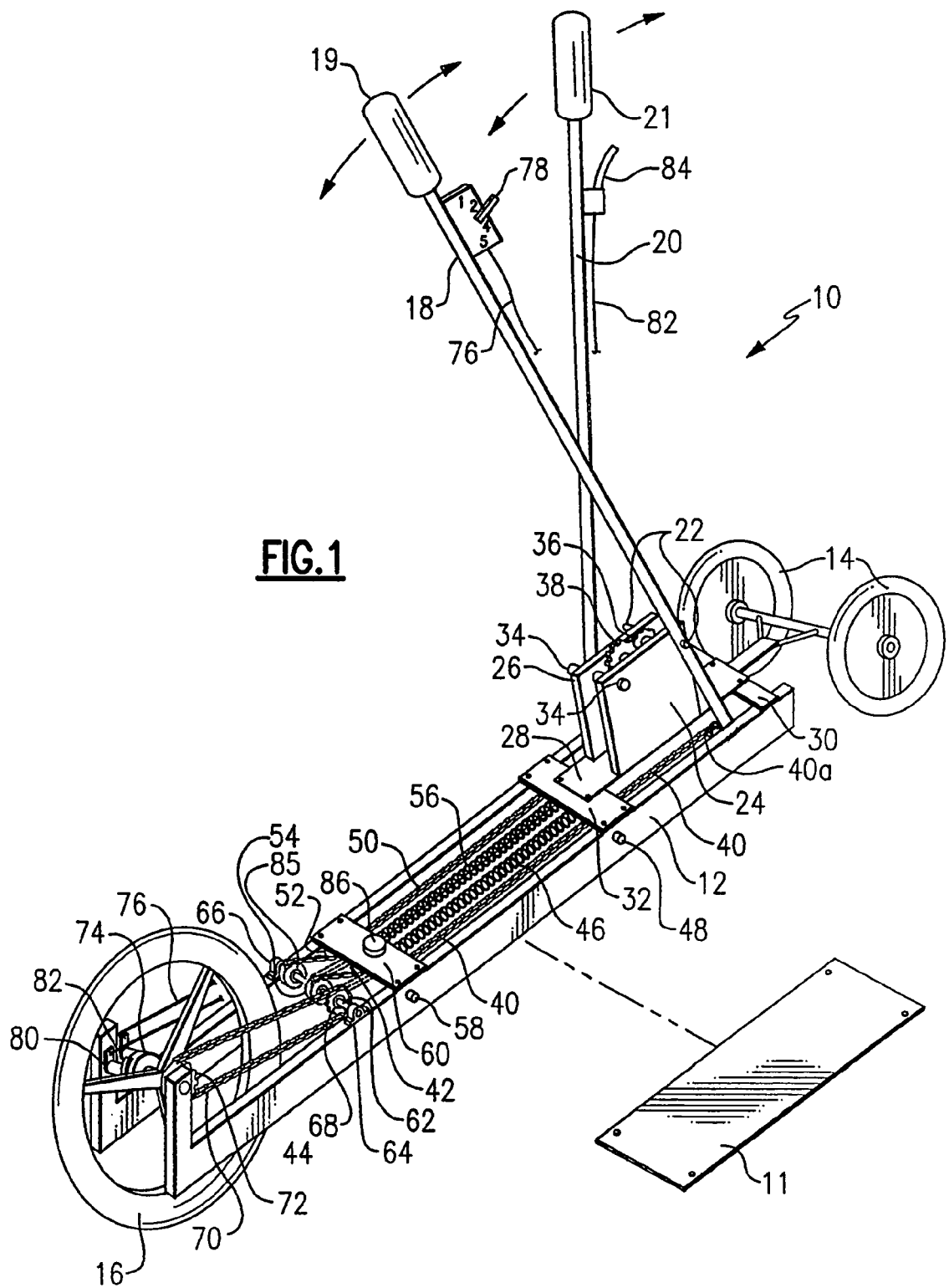
FIG. 1 is a perspective of a hand-powered vehicle.

Referring to FIG. 1 is shown, a hand-powered vehicle, identified in general by the reference numeral 10 and hereinafter referred to as a "scooter 10".

The scooter 10 is shown with a platform 11 removed therefrom and displaced off to the side. The platform 11 is removed to better reveal the novel drive train assemblies of the scooter 10.

The platform 11 is placed over the drive train assemblies (described in greater detail hereinafter) on a frame assembly 12 (partially shown) and intermediate a front pair of wheels 14 and a rear driven wheel 16. The platform 11 is attached to the frame 12 by well known methods, such as by bolting or welding.

The frame 12 also supports a first pivoting member 18 and a second pivoting member 20. The first pivoting member 18 is attached to a first shaft 22. The first shaft 22 passes through a pair of upright members 24, 26 that are each attached at the bottom thereof to a longitudinal member 28.

The longitudinal member 28 is attached at each end to a first cross member 30 and to a second cross member 32. The first and second cross members 30, 32 are attached to the frame 12. Therefore, each of the pair of upright members 24, 26 is supported eventually by the frame 12.

The second pivoting member 20 is attached to a second shaft 34. The second shaft 34 passes through the pair of upright members 24, 26.

A first idler gear 36 is attached to the first shaft 22 and is disposed between the upright members 24, 26. A second idler gear 38 is attached to the second shaft 34 and is also disposed between the upright members 24, 26. The first and second idler gears 36, 38 are operatively attached to each other (i.e., the gear teeth of each engage with one-another).

This ensures that if either the first pivoting member 18 or the second pivoting member 20 is urged by either hand of a user in a first direction, that the remaining pivoting member (either 18 or 20) must move in an opposite, second direction.

Therefore, if one were to displace longitudinally only one of the members (either 18 or 20) the remaining member 18, 20 would automatically move in the opposite direction because of interaction between the first and second idler gears 36, 38. For example, if the user were to pull only the first member 18 in a rearward direction, the second member 20 would automatically move forward in the opposite direction.

A user (not shown) grasps an upper right hand-grip 19 with his right hand and an upper left hand-grip 21 with his left hand. Force is applied by the arms of the user to the first and second members 18, 20 which are, in turn, alternately pulled backwards. The user stands on the platform 11 during normal use.

If desired, one of the members 18, 20 may also be urged (i.e., pushed) forward while the opposite member is pulled backward so as to better utilize the muscle groups of the user and to provide an even more continuous duty cycle to the power impulse.

A first chain segment 40 (refer also to FIG. 2) includes a first end 40a that is attached to a bottom of the first pivoting member 18. The first chain segment 40 extends rearward between the frame 12 and around a first chain idler gear 42.

The first chain segment 40 then loops around over the top of a first freewheel 44 and back in an opposite direction toward the front of the scooter 10.

The first chain segment 40 includes an opposite second end 40b that is attached to a first end of a first spring 46. The first spring 46 includes an opposite second end that is attached to a rod 48 that spans across both sides of the frame 12.

The first spring 46 maintains tension on the first chain segment 40.

A second chain segment 50 includes a first end that is attached to a bottom of the second pivoting member 20. The second chain segment 50 extends rearward between the frame 12 and around a second chain idler gear 52.

The second chain segment 50 then loops around over the top of a second freewheel 54 and back in an opposite direction toward the front of the scooter 10.

The second chain segment 50 includes an opposite second end that is attached to a first end of a second spring 56. The second spring 56 includes an opposite second end that is attached to the rod 48.

The second spring 56 maintains tension on the second chain segment 50.

Both the first chain idler gear 42 and the second chain idler gear 52 are disposed on an idler shaft 58 that spans across both sides of the frame 12 under a third cross member 60.

The first, second and third cross members 30, 32, 60 and the platform 11 also add strength to the frame 12.

The first freewheel 44 and the second freewheel 54 are each attached to an axle 62. The axle 62 is supported by bearing supports 64, 66 that are attached to opposite sides of the frame 12.

A drive gear 68 is also attached to the axle 62.

The first and second freewheels 44, 54 include gear teeth that are intended to mesh with a chain, of the type typically used with a bicycle (not shown). Therefore, the first and second chain segments 40, 50 are bicycle-type chain segments.

The first and second freewheels 44, 54 include an outer portion (with the gear teeth) and an inner concentric portion that is attached to the axle 62 by a threaded interior of each freewheel 44, 54. The outer portion is adapted to engage and drive the inner portion when it is rotated in a first direction and to freewheel (i.e., coast or spin freely) when it is rotated in an opposite second direction.

An example of the first and second freewheels 44, 54 is available from SHIMANO JAPAN Corporation and is identified by their part number SF-MX30.

Figure 2:
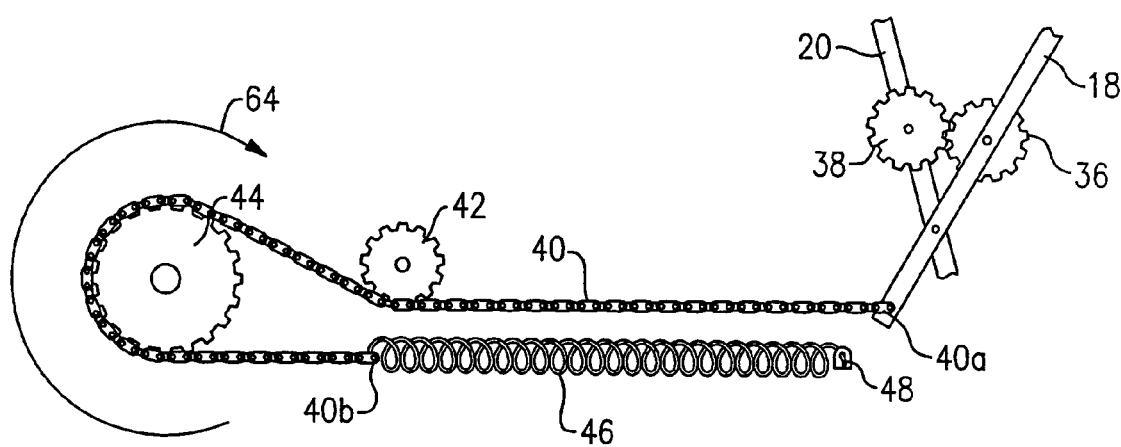
FIG. 2 is a detail side view of one of the two chain segments and one of two freewheels of the hand-powered vehicle of FIG. 1.

The first and second freewheels 44, 54 are mounted on the axle 62 so that when the first end of either chain segment 40, 50 is moving in a forward direction (relative to the scooter 10) the freewheel (either 44 or 54) that is being urged by the forward moving chain segment 40, 50 will drive the axle 62 causing it to rotate in a direction shown by arrow 64 (FIG. 2). The remaining freewheel (either 44 or 54) that is not being urged by the forward moving chain segment 40, 50 will coast and therefore will have no effect on the axle 62.

Regardless of which direction either pivoting member 18, 20 is being urged, the first chain segment 40 will be moving in a first direction and the second chain segment 50 will be moving in the opposite direction. Accordingly, one of the freewheels (either 44 or 54) will be freewheeling (i.e., coasting) and the remaining one will be supplying a driving force to rotate the axle 62 as shown by arrow 64 whenever the pivoting members 18, 20 are being urged back and forth.

Whenever the direction the pivoting members 18, 20 are being urged changes then the direction that each chain segment 40, 50 is moving also changes. At that time, whichever freewheel (either 44 or 54) was previously driving the axle 62 will, for a time, coast and the remaining freewheel that was previously coasting will, for a time, drive the axle 62.

A drive chain loop 70 is formed of typical bicycle chain and loops over the drive gear 68 and extends rearward and loops around a driven gear 72 that is attached to a geared internal hub 74. As the drive gear 68 rotates, it rotates the drive chain loop 70 which supplies motive power to rotate the driven gear 72, which causes rear driven wheel 16 to rotate.

The internal hub 74 includes selectable multi-speed gear ratios that can be selected by extending or retracting a gear shift cable 76 that extends out of the hub 74 at an end opposite that of where the driven gear 72 is located. The gear shift cable 76 extends to the first pivot member 18 where a gear shift lever 78 is located. Urging the gear shift lever 78 up or down extends or retracts the gear sift cable 76 from the hub 74 which changes the active gear ratio.

The gear ratio chosen determines how much the driven wheel 16 rotates for each revolution of the driven gear 72.

The hub 74 used includes five selectable gear ratios and is manufactured by Sturmey Archer Corporation and is sold under the tradename SPRINTER or SPRINTER ELITE. Information is available on their website at STURMEY-ARCHER.COM. Of course, other hubs (not shown) can be substituted for the one currently selected.

A brake mechanism 80 is attached to the hub. A brake cable 82 extends from the brake mechanism 80 to the second pivoting member 20 where a brake lever 84 is located. Squeezing the brake lever 84 engages the brake mechanism 80 which slows down or stops motion of the scooter 10, as desired.

According to a modification, a third freewheel 85 is attached to the axle 62 and a supplemental source of power 86, for example either an electric motor or gasoline engine, is attached to the third cross member 60 (or elsewhere, as desired). The supplemental source of power 86 is used to supply additional motive power to drive the axle 62 and therefore also the drive gear 68, the driven gear 72, and the driven wheel 16.

It is important to note that the optional third freewheel 85 is similar or identical to the first and second freewheels 44, 54 and is capable of coasting or of being driven by the supplement source of power 86. Therefore, the supplemental source of power 86, if included, blends in seamlessly with the three freewheels 44, 54, 85 to provide a transmission that integrates motive power coming from the pivoting members 18, 20 with motive power coming from the supplemental source of power 86.

The freewheels 44, 54, 85 allow the scooter 10 to coast without assist when desired, to be powered only by motion of the pivoting members 18, 20, only by the supplemental power source 86, or concurrently by whatever motive power is being supplied by the pivoting members 18, 20 and also by the supplemental power source 86. A lightweight, highly efficient method of powering the scooter 10 manually or by mechanical assist is thereby provided. If the supplement source of power 86 includes an electric motor, then a power source (not shown) such as a battery or a solar panel must also be included.

The pair of front wheels 14 are adapted to pivot about an offset center axis so that they turn left or right when the scooter 10 is leaned in the appropriate direction.

If desired, the pair of front wheels 14 could be replaced by a single front wheel to provide a more conventional looking type of a two-wheeled scooter (not shown). The advantage to using a total of three or more wheels is that the scooter 10 is able to maintain itself in an upright attitude without falling over.

Similarly, if desired the rear drive wheel 16 could be replaced with either a pair of rear drive wheels (not shown).

In use, an operator (i.e., the user) stands on the platform 11 of the scooter 10 and urges the members 18, 20 alternately back and forth which propels the scooter 10 and the user in a forward direction.

The initial gear ratio selected is high (sometimes called a low gear) which means that considerable motion by the freewheels 44, 54 is required to rotate the driven wheel 16 a given amount. A large mechanical advantage is provided making starting and traveling uphill or with a heavy load easier.

Once underway, the gear shift lever 78 is urged to a lower gear ratio (sometimes called a higher gear) which means that less motion by the freewheels 44, 54 is required to rotate the driven wheel 16 the same given amount.

If desired, other gear ratios are selected, as desired.

A high gear ratio (i.e., a low gear) produces a decrease in the force that is required to urge the pivot members 18, 20 as well as a decrease in the distance that is covered per stroke.

Conversely, a selection of a lower gear ratio (i.e., a higher gear) results in a greater force being required to urge the scooter 10 forward and also in a greater length of travel by the scooter 10 for each stroke that is made of the pivot members 18, 20.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A hand-powered vehicle adapted for motion powered by certain of the muscles of a user, comprising:
   (a) a frame
   (b) at least two wheels attached to said frame;
   (c) means for converting an alternating back and forth motion by two arms of said user into a rotary motion that is adapted to supply a torque to at least one of said at least two wheels and wherein when one arm is being pulled rearward the remaining arm is moving forward and wherein when said remaining arm is being pulled rearward said one arm is moving forward and wherein said torque is adapted to urge said hand-powered vehicle in a forward direction;
   wherein said means for converting an alternating back and forth motion by two arms of said user into a rotary motion is adapted to supply said torque when a first force is alternately applied by said one arm to a first member sufficient to urge said first member from said forward position into said rearward position and wherein when said first member is disposed at said rearward position said second force is applied by said remaining arm to said second member sufficient to urge said second member from said forward position into said rearward position;
   wherein when said first force is being applied said second force is diminished and when said second force is being applied said first force is diminished;
   wherein said means for converting an alternating back and forth motion by said two arms of said user into a rotary motion includes a first chain segment having a first end attached to a bottom of said first member and wherein said first chain segment extends around a freewheel that is attached to an axle and wherein said freewheel is adapted to urge said axle to rotate in accordance with said freewheel when said freewheel is rotated in a first direction and wherein said freewheel is adapted to coast with respect to said axle when said freewheel is rotated in an opposite direction and a second chain segment having a first end attached to a bottom of said second member and wherein said second chain segment extends around a second freewheel that is attached to said axle and wherein said second freewheel is adapted to urge said axle to rotate in accordance with said second freewheel when said second freewheel is rotated in said first direction and wherein said second freewheel is adapted to coast with respect to said axle when said second freewheel is rotated in an opposite direction and including a drive gear attached to said axle, said drive gear adapted to urge a driven gear that is attached to a driven wheel to rotate in said first direction when either said freewheel or said second freewheel is rotated in said first direction; and wherein said means for converting an alternating back and forth motion by two arms of said user into a rotary motion is adapted to produce said rotary motion if a first of said two arms is used to urge either said first or said second member alternately back and forth when said remaining one of said two arms is not being used to urge either said first or said second member and wherein said first and said second members require a user to stand on said frame; and wherein said at least two wheels includes a single driven rear wheel and a pair of front wheels, said pair of front wheels disposed in a spaced apart parallel orientation with respect to each other and wherein when said vehicle is leaned in a first direction said pair of front wheels are adapted to tilt so as to steer said vehicle in said first direction and when said vehicle is leaned in an opposite second direction said pair of front wheels are adapted to tilt so as to steer said vehicle in said second direction.

2. The hand-powered vehicle of claim 1 including a first shaft attached to said first member and a first idler gear attached to said first shaft and a second shaft attached to said second member and a second idler gear attached to said second shaft, and wherein said first and said second idler gears engage with each other wherein motion by either member in either direction will cause the remaining member to move in an opposite direction.

3. The hand-powered vehicle of claim 1 wherein said vehicle is a scooter.

4. The hand-powered vehicle of claim 1 wherein said means for converting an alternating back and forth motion by two arms of said user into a rotary motion is adapted to supply said torque when a first force is applied by said one arm to a first member sufficient to urge said first member from a forward position into a rearward position.

5. The hand-powered vehicle of claim 4 wherein said means for converting an alternating back and forth motion by two arms of said user into a rotary motion is adapted to supply said torque when a second force is applied by said remaining arm to a second member sufficient to urge said second member from a forward position into a rearward position.

6. The hand-powered vehicle of claim 1 wherein said freewheel and said second freewheel include clutch means.

7. The hand-powered vehicle of claim 1 including an internal gear hub attached to said driven wheel, said internal gear hub including at least two selectable gear ratios.

8. The hand-powered vehicle of claim 7 wherein said driven gear is attached to said hub.

9. The hand-powered vehicle of claim 7 wherein said hub includes at least five selectable gear ratios.

10. The hand-powered vehicle of claim 7 including a brake mechanism attached to said scooter.

11. The hand-powered vehicle of claim 1 including a first spring that is attached to an opposite end of said first chain segment at one end of said spring and wherein an opposite end of said spring is attached to said frame sufficient to apply a tension to said first chain segment.

12. The hand-powered vehicle of claim 11 including a first chain segment idler that bears against a portion of said first chain segment.

13. The hand-powered vehicle of claim 1 including a second spring that is attached to an opposite end of said second chain segment at one end of said second spring and wherein an opposite end of said second spring is attached to said frame sufficient to apply a tension to said second chain segment.

14. The hand-powered vehicle of claim 13 including a second chain segment idler that bears against a portion of said second chain segment.

15. The hand-powered vehicle of claim 1 including means for varying the magnitude of torque that is applied to said driven wheel.

16. The hand-powered vehicle of claim 1 including means for providing a supplement source of power operatively attached to said driven wheel.

17. The hand-powered vehicle of claim 1 including a third freewheel attached to said axle and a supplemental source of power attached to said third freewheel.

18. The hand-powered vehicle of claim 17 wherein said supplemental source of power includes an electric motor.

19. The hand-powered vehicle of claim 17 wherein said supplemental source of power includes a gasoline motor.

20. A hand-powered vehicle adapted for motion powered by certain of the muscles of a user, comprising:
(a) a frame
(b) at least two wheels attached to said frame;
(c) means for converting an alternating back and forth motion by two arms of said user into a rotary motion that is adapted to supply a torque to at least one of said at least two wheels and wherein when one arm is being pulled rearward the remaining arm is moving forward and wherein when said remaining arm is being pulled rearward said one arm is moving forward and wherein said torque is adapted to urge said hand-powered vehicle in a forward direction;

wherein said means for converting an alternating back and forth motion by two arms of said user into a rotary motion is adapted to supply said torque when a first force is alternately applied by said one arm to a first member sufficient to urge said first member from said forward position into said rearward position and wherein when said first member is disposed at said rearward position said second force is applied by said remaining arm to said second member sufficient to urge said second member from said forward position into said rearward position;

wherein when said first force is being applied said second force is diminished and when said second force is being applied said first force is diminished;

wherein said means for converting an alternating back and forth motion by said two arms of said user into a rotary motion includes a first chain segment having a first end attached to a bottom of said first member and wherein said first chain segment extends around a freewheel that is attached to an axle and wherein said freewheel is adapted to urge said axle to rotate in accordance with said freewheel when said freewheel is rotated in a first direction and wherein said freewheel is adapted to coast with respect to said axle when said freewheel is rotated in an opposite direction and a second chain segment having a first end attached to a bottom of said second member and wherein said second chain segment extends around a second freewheel that is attached to said axle and wherein said second freewheel is adapted to urge said axle to rotate in accordance with said second freewheel when said second freewheel is rotated in said first direction and wherein said second freewheel is adapted to coast with respect to said axle when said second freewheel is rotated in an opposite direction and including a drive gear attached to said axle, said drive gear adapted to urge a driven gear that is attached to a driven wheel to rotate in said first direction when either said freewheel or said second freewheel is rotated in said first direction; and wherein said means for converting an alternating back and forth motion by two arms of said user into a rotary motion is adapted to produce said rotary motion if a first of said two arms is used to urge either said first or said second member alternately back and forth when said remaining one of said two arms is not being used to urge either said first or said second member and wherein said first and said second members require a user to stand on said frame; and including a first shaft attached to said first member and a first idler gear attached to said first shaft and a second shaft attached to said second member and a second idler gear attached to said second shaft, and wherein said first and said second idler gears engage with each other wherein motion by either member in either direction will cause the remaining member to move in an opposite direction.

21. A hand-powered vehicle adapted for motion powered by certain of the muscles of a user, comprising:
(a) a frame
(b) at least two wheels attached to said frame;
(c) means for converting an alternating back and forth motion by two arms of said user into a rotary motion that is adapted to supply a torque to at least one of said at least two wheels and wherein when one arm is being pulled rearward the remaining arm is moving forward and wherein when said remaining arm is being pulled rearward said one arm is moving forward and wherein said torque is adapted to urge said hand-powered vehicle in a forward direction;

wherein said means for converting an alternating back and forth motion by two arms of said user into a rotary motion is adapted to supply said torque when a first force is alternately applied by said one arm to a first member sufficient to urge said first member from said forward position into said rearward position and wherein when said first member is disposed at said rearward position said second force is applied by said remaining arm to said second member sufficient to urge said second member from said forward position into said rearward position;

wherein when said first force is being applied said second force is diminished and when said second force is being applied said first force is diminished;

wherein said means for converting an alternating back and forth motion by said two arms of said user into a rotary motion includes a first chain segment having a first end attached to a bottom of said first member and wherein said first chain segment extends around a freewheel that is attached to an axle and wherein said freewheel is adapted to urge said axle to rotate in accordance with said freewheel when said freewheel is rotated in a first direction and wherein said freewheel is adapted to coast with respect to said axle when said freewheel is rotated in an opposite direction and a second chain segment having a first end attached to a bottom of said second member and wherein said second chain segment extends around a second freewheel that is attached to said axle and wherein said second freewheel is adapted to urge said axle to rotate in accordance with said second freewheel when said second freewheel is rotated in said first direction and wherein said second freewheel is adapted to coast with respect to said axle when said second freewheel is rotated in an opposite direction and including a drive gear attached to said axle, said drive gear adapted to urge a driven gear that is attached to a driven wheel to rotate in said first direction when either said freewheel or said second freewheel is rotated in said first direction; and wherein said means for converting an alternating back and forth motion by two arms of said user into a rotary motion is adapted to produce said rotary motion if a first of said two arms is used to urge either said first or said second member alternately back and forth when said remaining one of said two arms is not being used to urge either said first or said second member and wherein said first and said second members require a user to stand on said frame; and including an internal gear hub attached to said driven wheel, said internal gear hub including at least two selectable gear ratios.

* * * * *